(12) United States Patent
Burke et al.

(10) Patent No.: US 6,453,040 B1
(45) Date of Patent: Sep. 17, 2002

(54) TELEPHONE ADAPTER AND TELEPHONE SYSTEM PROVIDING MULTIPLE TELEPHONE LINES

(75) Inventors: Timothy M. Burke, Algonquin; Gregory W. Fuller, Lake in the Hills, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/271,599

(22) Filed: Mar. 17, 1999

(51) Int. Cl.[7] .................................................. H04M 9/00
(52) U.S. Cl. ............................ 379/387.01; 379/387.02; 379/395.01; 379/399.02
(58) Field of Search ........................... 379/371, 373, 379/375, 29, 34, 37, 49, 90.01, 93.01, 93.05, 93.07, 98.09, 93.11, 100.12, 100.11, 102.03, 102.02, 120, 156, 157, 158, 160, 165, 167, 171, 177, 201, 214; 455/4.2, 5.1; 370/352

(56) References Cited

U.S. PATENT DOCUMENTS

| | | | | |
|---|---|---|---|---|
| 4,581,733 A | * | 4/1986 | Sarson et al. ............... 370/67 |
| 5,719,872 A | * | 2/1998 | Dubberly et al. ........... 370/487 |
| 5,748,680 A | * | 5/1998 | Mobin ......................... 375/317 |
| 5,818,825 A | * | 10/1998 | Corrigan et al. ............. 370/329 |
| 5,862,451 A | * | 1/1999 | Grau et al. .................... 455/5.1 |
| 5,917,814 A | * | 6/1999 | Balatoni et al. ............. 370/352 |
| 5,946,374 A | * | 8/1999 | Bower ........................... 379/29 |
| 5,966,636 A | * | 10/1999 | Corrigan et al. .............. 455/4.2 |
| 6,011,579 A | * | 1/2000 | Newlin ...................... 379/93.21 |
| 6,075,784 A | * | 6/2000 | Frankel et al. ............... 370/352 |

* cited by examiner

Primary Examiner—Fan Tsang
Assistant Examiner—Ovidio Escalante
(74) Attorney, Agent, or Firm—Heather L. Mansfield; Romi Bose

(57) ABSTRACT

An adapter (42) for connecting a telephone (52) to a telephone wire (40) has a subscriber line interface circuit (SLIC 113) with a jack for connecting a telephone to the SLIC, a line interface (110) for coupling to a telephone line, a signaling circuit (111) coupled to the line interface for receiving and providing subscriber line signaling on the telephone line, a codec (112) coupled to the SLIC, performing a voice coding/decoding function; and a timing circuit (202) for time multiplexing and demultiplexing of digitized voice signals between the SLIC and the line interface.

17 Claims, 5 Drawing Sheets

TELEPHONE ADAPTER AND TELEPHONE SYSTEM PROVIDING MULTIPLE TELEPHONE LINES

FIELD OF THE INVENTION

This invention relates to a telephone system for providing multiple telephone lines in a residence, a small office or similar environment and it relates to a telephone adapter for coupling a telephone to a telephone line.

BACKGROUND OF THE INVENTION

In a typical residence, a single telephone line is distributed around a home with multiple telephone jacks in different rooms, so that one or more telephones can be connected to the telephone line. The telephone line is hard-wired to a line entering the premises. If further telephone lines are desired, these are also hard-wired at the point of entry to the premises and distributed to various wall connection points or jacks around the house or building.

Cable operators have identified an opportunity to provide telephones to the home over a co-axial or hybrid fiber cable. Such cables are relatively broad-band and can deliver more than one telephone line to the home. It remains necessary, however, to hard-wire each telephone line from the point of entry to the various outlets in the home or premises. This need to hard-wire additional lines is a disincentive for customers to subscribe to additional services. The addition of new lines to a home or other premises could involve expensive feeding of cables, installation of jacks and even redecorating after installation. In a small office environment there is further disincentive of disruption caused by these works. Alternatively, inconvenient, unsightly and hazardous wires are laid out across carpets and along walls in an unsatisfactory manner.

Radio solutions provide the ability to convey signals from a point of entry to a building to multiple point points throughout the building without the need for laying of additional cables, but radio solutions have drawbacks such as limited availability of radio spectrum, privacy and cross-talk issues, room-to-room penetration issues and expense.

There is a need for an improved manner of delivering telephone services to telephones or other telephony terminals in a residence, small office, building or similar environment.

DETAILED DESCRIPTION OF A PREFERRED EMBODIMENT

Figure 1:
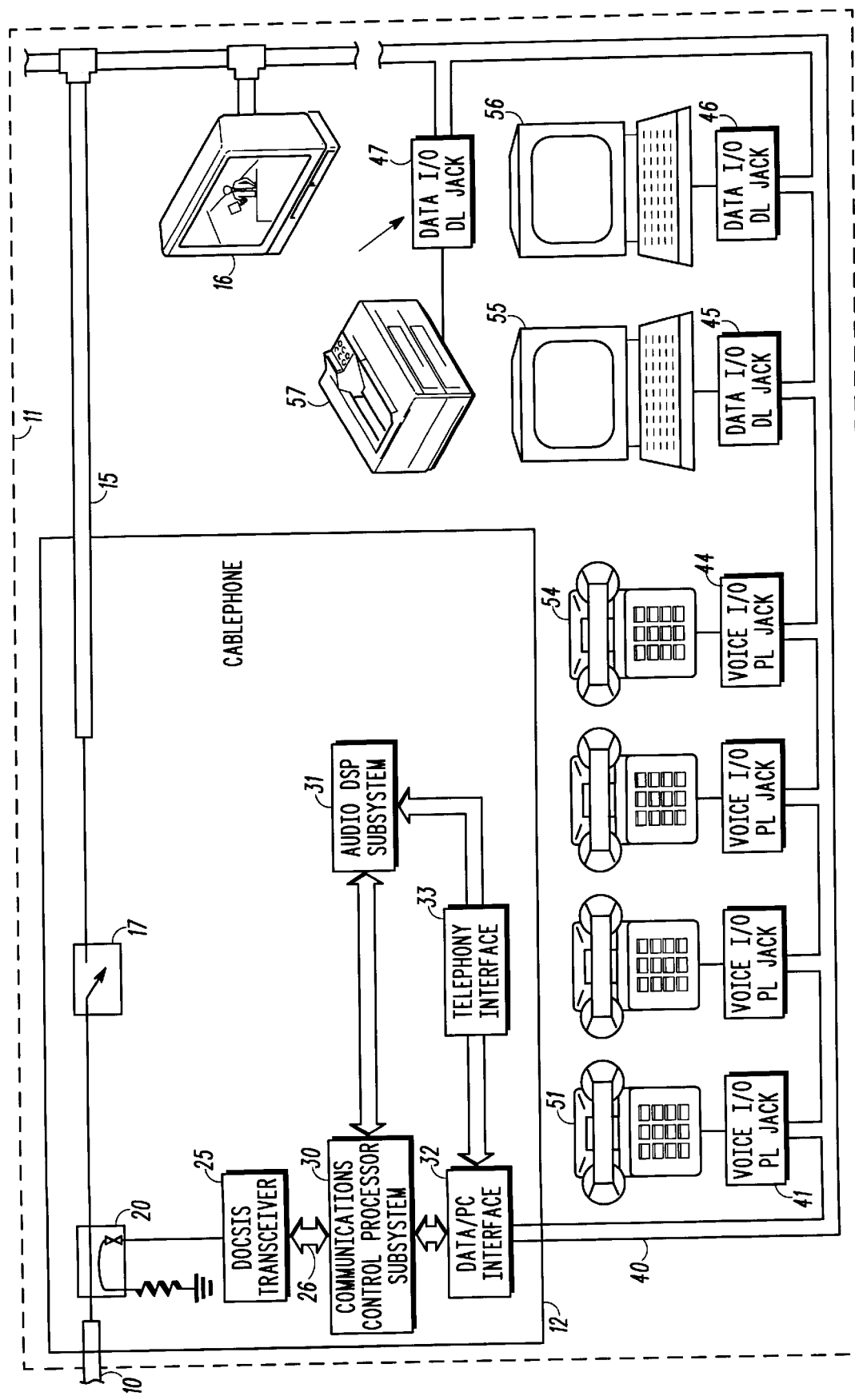
FIG. 1 is a diagram illustrating a telephone system in accordance with the present invention.

Referring to FIG. 1, a telephone and cable system is illustrated comprising a co-axial cable 10 entering a building 11, such as a home, small office or similar premises, and connected, at a first point of connection, to a cable phone connector box 12. In the illustration, the cable phone connector box 12 is located inside the premises 11, but it should be understood that the box 12 can equally be mounted on an external wall of the premises 11. The cable 10 emerges from the cable phone connector box 12 in the form of an indoor co-axial cable 15 and serves a television 16 and other video boxes in the home in a manner well known in the art. A switch 17 selectively connects the outdoor cable to the indoor cable 15. A coupler 20 is coupled to the cable 10 for the purposes of coupling telephone signals between the cable 10 and the DOCSIS (Data Over Cable System Interface Specification, also known as MCNS, Multimedia Cable Network System) transceiver 25. The DOCSIS transceiver 25 provides a broadband medium 26 for delivery of telephone services to the home. The broadband medium 26 is capable of delivering four, six or more separate telephone lines. It should be understood that other broadband media can deliver these telephone lines to the home in the place of the co-axial cable or a DOCSIS transceiver. Examples include ISDN, broadband wireless and satellite delivery systems.

The broadband medium 26 is connected to a communications control processor subsystem 30, which in turn is connected to an audio digital signal processor (DSP) subsystem 31 and a data/PC interface 32. A telephony interface 33 is connected between the audio DSP 31 and the data /PC interface 32. The data/PC interface 32 is connected to a regular copper (or other electrical conductor) telephone line 40 extending throughout the premises.

The telephone line 40 is typically a pair of parallel copper wires encased in a plastic sheath. Such a typical telephone line suffers from high noise and is therefore relatively narrowband (relative to the broadband medium 26 or the co-axial cable 10). Such a telephone line is capable of conveying analog audio telephone signals in the 300 Hz to 3 kHz range (baseband) and in addition is capable of carrying some digital signals in a super-audio band above approximately 3 kHz. These band ranges are not necessarily exact, neither are they critical. A human ear maybe of capable of hearing signals above 3 kHz and the term "super-audio" is not necessarily intended to mean strictly ultrasonic, but it is a useful feature of the arrangement that the super-audio digital signals can, if desired, co-exist with baseband analog signals. Thus, user of the baseband analog signal may be unaware of the super-audio signal being conveyed on the same line. The super-audio signal, if heard, will sound like high-pitched white noise.

Connected to the telephone line 40 are multiple telephone adapters 41 to 44 and multiple data input/output adapters 45, 46 and 47. Telephones (telephone terminals) 51 to 54 are connected to the adapters 41–44 respectively. Data terminals, personal computers or similar equipment 55 and 56 are connected to the data by I/O adapters 45 and 46. A data terminal 57, such as a printer, is connected to the data I/O adapter 47. The data I/O adapter 47 is preferably a HPNA (Home Phoneline Network Alliance) compatible data interface, either integrated with the data terminal 57 or external thereto.

In FIG. 1, the data/PC interface is illustrated as being connected to the telephone line 40, and the telephony interface 33 is illustrated as being connected to the data/PC interface 32, however, this arrangement is not critical. The telephony interface 33 and data/PC interface 32 can both be connected to the telephone line 40 or it can be the telephony interface 33 that is connected to the telephone line 40. Indeed it is not necessary to have both the data/PC interface 32 and the telephony interface 33.

Figure 2:
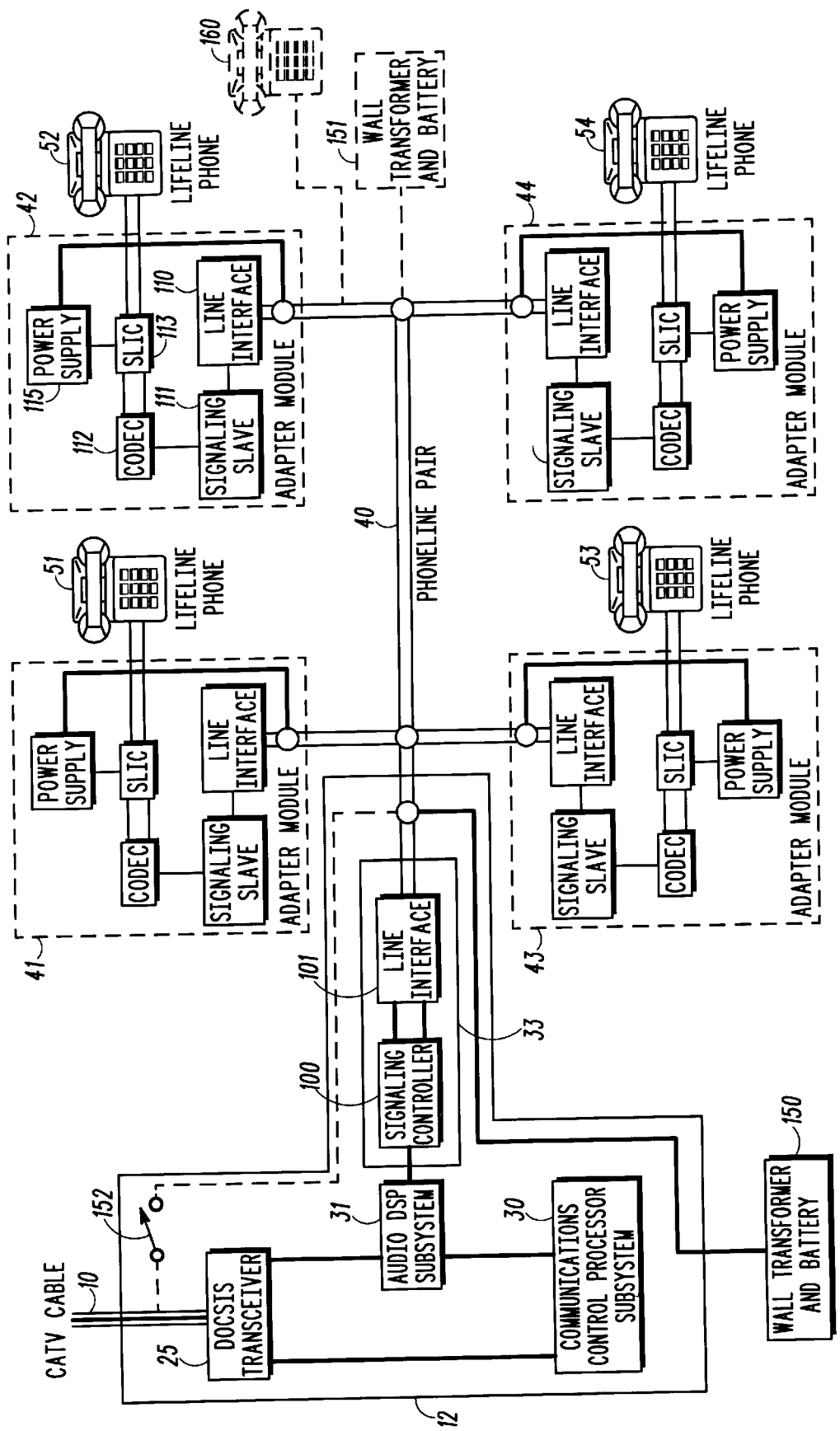
FIG. 2 is a further system diagram illustrating elements of the system of FIG. 1 in greater detail.

In greater detail, FIG. 2 shows the cable phone box 12 and the adapter modules 41–44. In FIG. 2, just the telephony interface 33 is shown within the cable phone box 12 for the purposes of illustration. The telephony interface 33 comprises a signaling controller 100 and a line interface 101.

Each of the adapter modules, for example module 42, comprises a line interface 110 coupled to the telephone line 40, a signaling slave circuit 111 coupled to the line interface 110, a codec 112 (i.e. a coding/decoding circuit or DSP) coupled to the signaling slave 111., a subscriber line interface card (SLIC) 113 coupled to the codec 112 and a power supply 115 coupled to the telephone line 40 and coupled to the SLIC 113. The associated telephone (e.g. telephone 52) is coupled to the SLIC 113. The SLIC 113 is a standard element that need not be described in detail. The signaling slave 111 is preferably a digital European cordless telephone (DECT) signaling integrated circuit.

FIG. 2 shows a wall transformer and battery 150 associated with the cable phone box 12 supplying DC power to the telephone line 40. As an alternative to the wall transformer and battery 150, a wall transformer and battery 151 can be introduced within the premises. As a further alternative, a switch 152 with appropriate cabling connects the co-axial cable 10 to the telephone line 40 to provide power to the telephone line 40 from the co-axial cable 10.

The operation of the system is now described. In operation, with no incoming or outgoing calls, all the telephone adapters 41–44 are powered by DC power from the telephone line 40, ready to receive an incoming call or to make an outgoing call.

At least two discrete telephone channels and preferably four (or six) discrete telephone channels are provided from a network (not shown) to the co-axial cable 10. Each telephone line has a discrete telephone number associated therewith.

In the case of an incoming call on one of the telephone lines, the communications control processor subsystem 30 responds to the incoming call and causes the audio DSP subsystem 31 to enter an active mode ready for digitization and coding of incoming voice. At the same time the communications control processor subsystem 30 informs the signaling controller 100 of the existence of the incoming call and the identity of the telephone line on which the call is being received (identified according to the telephone number dialed by the calling party, which determines the line or channel over which the call arrives at the premises). Signaling controller 100 generates a data packet modulated as a Gaussian filtered non-return-to-zero modulated signal, modulated in the super-audio band in the form of a time division multiplex packet with a packet header. The packet header identifies a start of an incoming call and identifies the telephone line or channel over which the call is received (e.g. line 1, line 2 etc. or telephone number 847-576 1234, 847-576 1235 etc.).

One or more of the adapter modules 41–44 is programmed to identify the telephone number (or simply line number, e.g. line 1, 2, 3, or 4) that is identified in the packet header. The case will be considered where adapters 42 and 44 are programmed to respond to this telephone line. The signaling slave 111 in adapter 42 and the corresponding signaling slave in adapter 44 identifies the packet header and delivers a signal to the SLIC 113 (via the codec 112). The SLIC 113 provides a ringing signal to the telephone 32 in a manner well known in the art. Simultaneously, the corresponding adapter 44 causes telephone 54 to ring.

When a user lifts the receiver of telephone 52 and puts that telephone in an off-hook condition, the SLIC delivers an off-hook signal to the signaling slave 111, which generates a packet identifying the off-hook condition. This packet is delivered by the line interface 110 to the line interface 101 of the cable phone connector box 12. The signaling controller 100 identifies the off-hook condition and therefore the completed connection and informs the network accordingly. The audio DSP subsystem 31 now encodes audio from the cable 10 and the signaling controller 100 delivers this in TDM fashion to the signaling slave 111. The signaling slave 111 delivers the encoded audio to the codec 112 which converts it to analog form and delivers it to telephone 52 via the SLIC 113.

Figure 3:
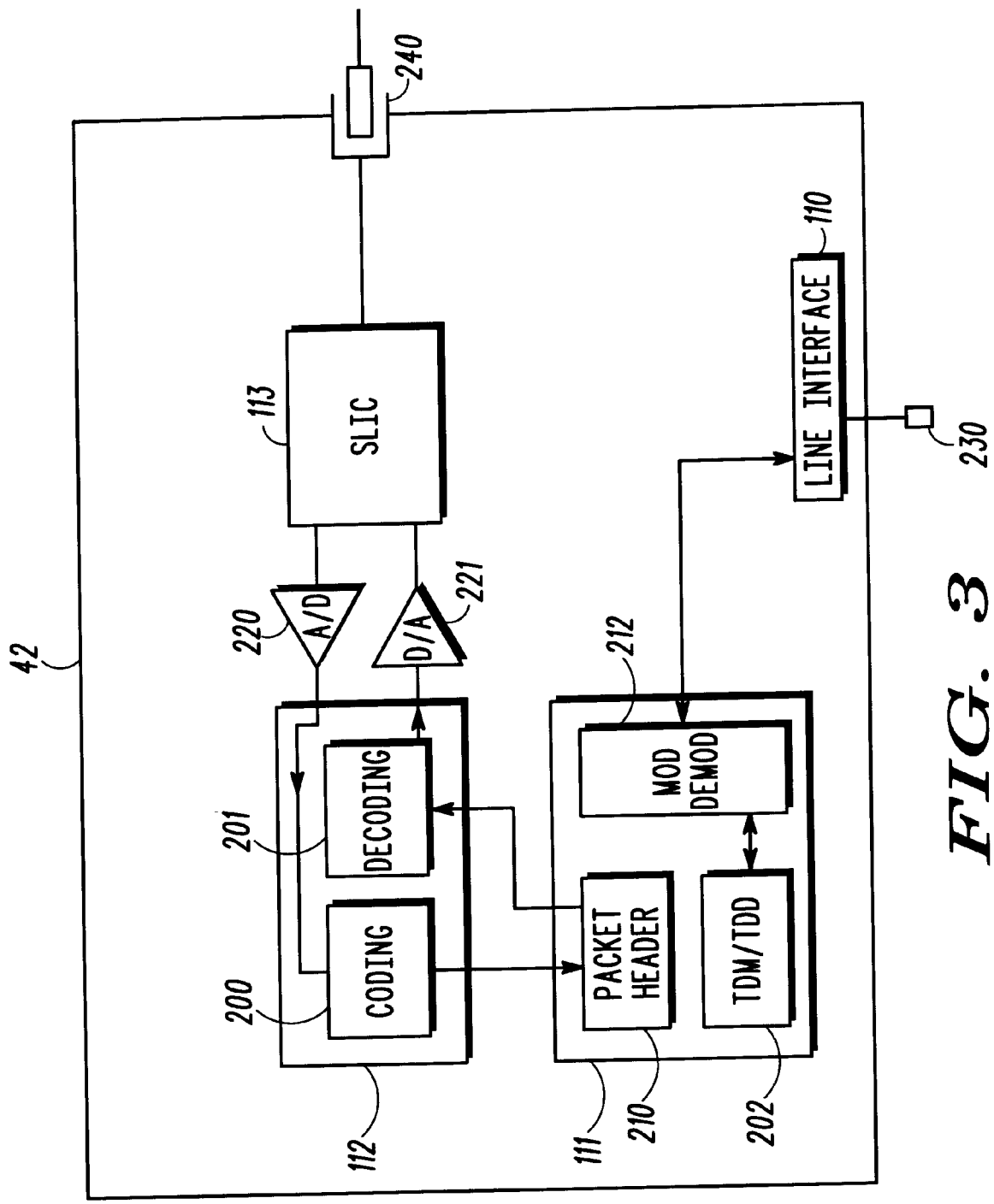
FIG. 3 is a block diagram illustrating elements of an adapter module of FIG. 2 in greater detail.

Referring to FIG. 3, details of the interface 42 are shown. The SLIC 113 is coupled via an analog-to-digital (A/D) converter 220 to a coding function 200 in the codec, which is coupled to a packet header handling circuit 210 in the signaling slave 111. The packet header handling circuit 210 is coupled to a decoding function 201 in the codec 112, which in turn is coupled to the SLIC 113 via a digital-to-analog (D/A) circuit 221. The signaling slave has a TDM/TDD timing control circuit 202 coupled to the packet header handling circuit 210 and has a modulator/demodulator (modem) circuit 212 coupled between the TDM/TDD timing control circuit 202 and the line interface 110.

A telephone jack socket 240 or other connector is connected to the SLIC for receiving a telephone jack plug or other connector. A telephone jack plug 230 or other connector is connected to the line interface 110 for plugging into a wall-mounted or similar telephone jack socket or other connector.

The coding function 200 and the decoding function 201 need not be described in detail. Suitable coding includes PCM or ADPCM coding. The modem function 212 need not be described in detail. Suitable modulation includes Gaussian filtered non-return-to-zero modulation or Gaussian minimum shift keying modulation or QPSK or the like.

In operation, audio signals from the telephone 54 are digitized by the A/D converter 220 and coded by the coding function 200 to provide reduced bandwidth encoded voice signals. These are packetized and a packet header is added in packet header handling circuit 210. The timing of transmission of the resultant packets is controlled by TDM/TDD timing circuit 202 and the signals are modulated by modem circuit 212 and sent out over the telephone line 40 via line interface 110. In reverse, packets of encoded audio signals are received via the line interface 110 at times determined by TDM/TDD timing circuit 202 and demodulated by modem circuit 212. Packet headers are removed by packet header handling function 210, from which signaling slave 111 is able to determine if the signals are intended for this adapter module or another adapter module. If the signals are indeed intended for this adapter module, the packet payloads are delivered to decoding function 201, decoded to digitized audio, converted to analog form in D/A converter 221 and delivered to the telephone 54 via SLIC 113.

It will be understood by one of ordinary skill in the art that elements and functions of FIG. 3 can be provided in different forms and arrangements. For example, the codec 112 and signaling slave 111 can be integrated in a single DSP or dedicated ASIC, or functions of the signaling slave (e.g. the packet header function and/or the TDM/TDD function) can be transferred into the codec 112. The SLIC 113 can be integrated with the codec 112. The line interface 110 may have an amplifier or driver circuit, but any such function can be integrated with the signaling slave and the line interface 110 can amount to no more than a connector.

Figure 4:
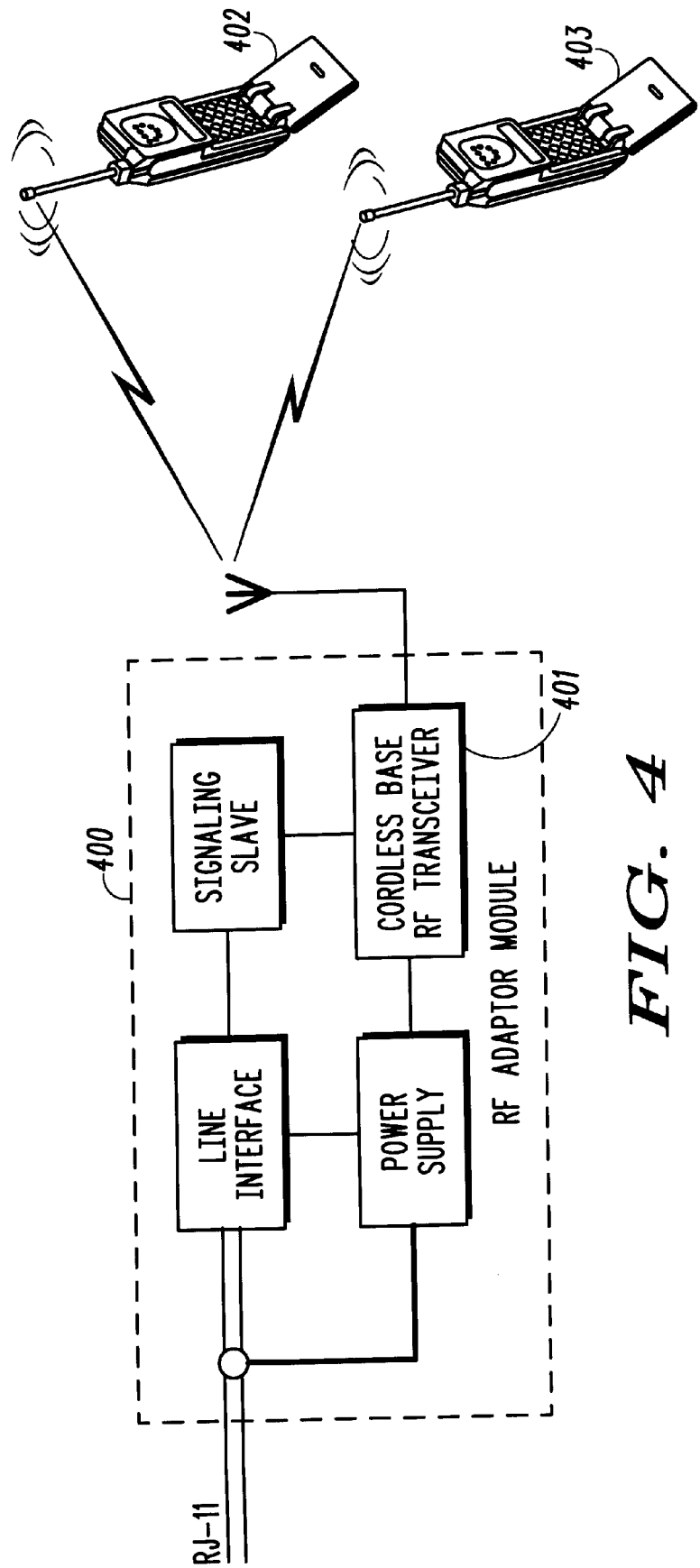
FIG. 4 is an illustration of an adapter module for a wireless interface.

Referring now to FIG. 4 an adapter module 400 similar to adapter module 42 is shown, where the SLIC is replaced by a cordless base RF transceiver 401. The cordless base RF transceiver 401, which is an element well known in the art, can communicate with cordless handsets 402 and 403.

Figure 5:
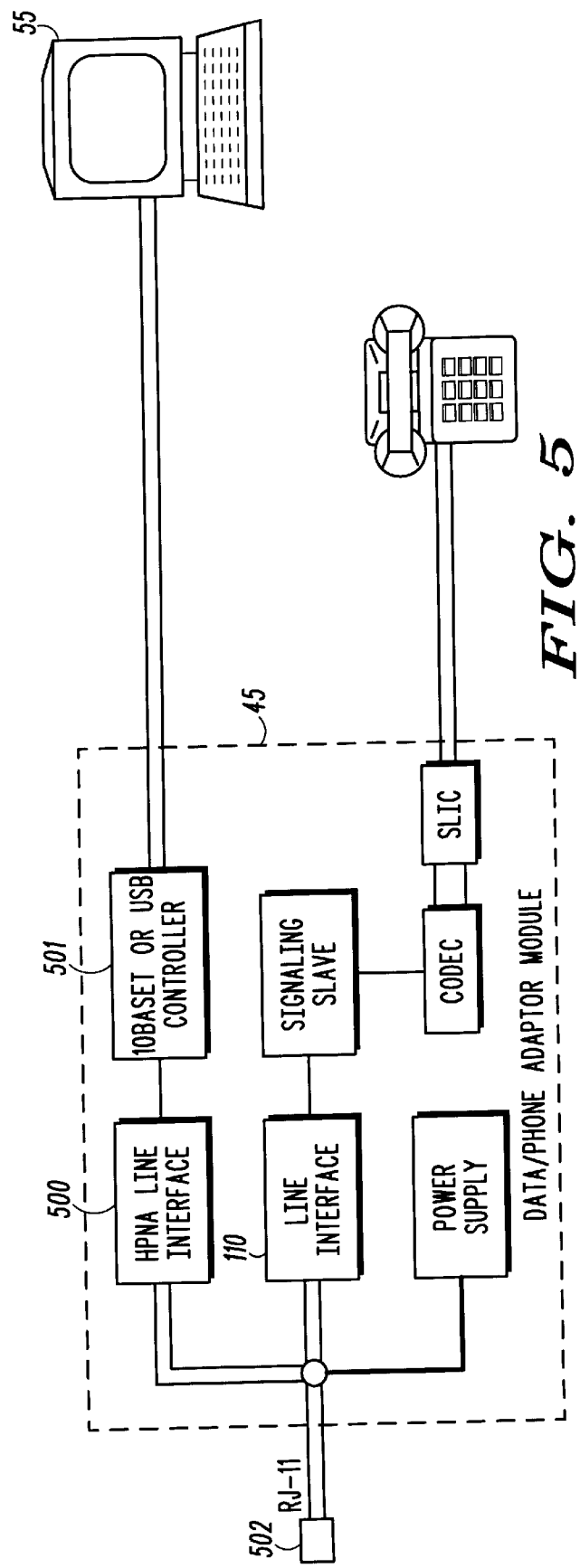
FIG. 5 is an illustration of an adapter module for a telephone and data terminal.

Referring to FIG. 5, an adapter module similar to that adapter module 42 of FIG. 2 is illustrated, but in addition to the line interface 110, a HPNA line interface 500 is connected to the telephone jack 502 and a 10baseT or universal serial bus controller 501 is connected to the HPNA line 500. A computer or other data terminal 55 is connected to the controller 501.

Figure 6:
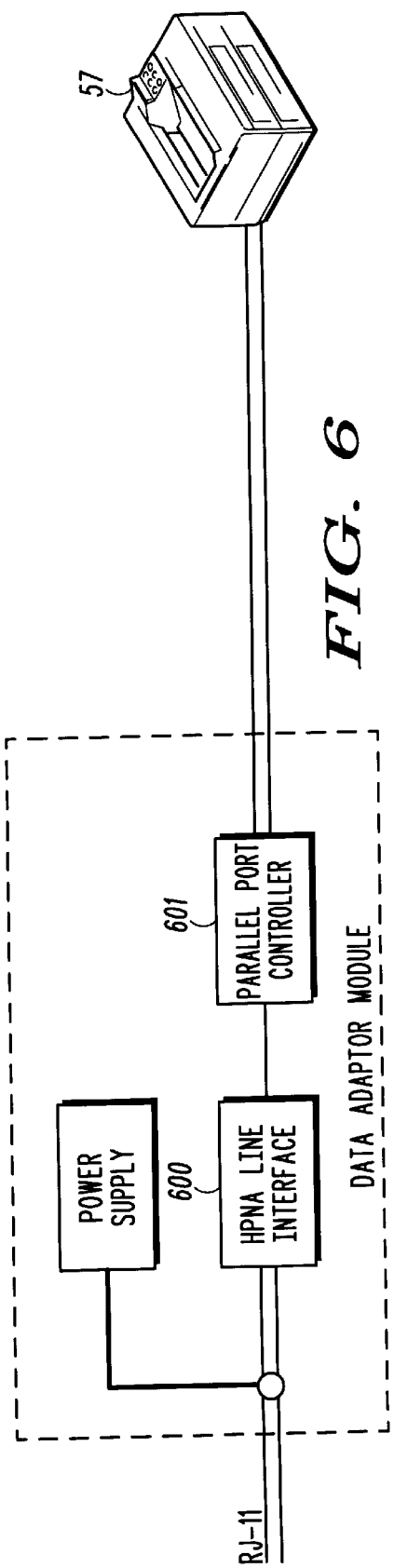
FIG. 6 is an illustration of an adapter module for a data terminal.

Referring to FIG. 6, an alternative adapter module is shown having an HPNA line interface 600 and a parallel port controller 601 coupled to the HPNA line interface. A dedicated data device 57 is connected to the parallel port controller 601. If any one of these devices of FIGS. 4–6 is connected to the telephone line 40, it is readily able to communicate with the cable phone connector box 12 or with other devices connected to the telephone line using the TDM protocol on the telephone line.

Certain other features of the system are now described with reference again to FIG. 1. Using software protocols contained within the communications control processor subsystem 30 or a microcontroller contained within the signaling controller 100, an advance set of PBX-like (private branch exchange) features are provided without the addition of other components. For example, since multiple lines of service (or phone numbers) are provided over a common interface, any telephone connected to an adapter module 41 can connect to any other telephone on another adapter module 42–44 by using the DTMF (dual tone multi-frequency) keypad on the phone. If a phone is assigned to line number 1 and the user wishes to connect (on a temporary or permanent basis) to line number 2, a simple key entry, such as # 2, can be entered. A DTMF detector resident in the signaling slave 111 converts the DTMF signal into an appropriate digital control signal which is sent back to the controller 100 which realigns time slots within the TDM frame to "bridge" line 2 with line 1. Thus, ordinary telephones may be used for dynamic line assignment rather than dedicated key or PBX telephones.

Another PBX-like feature is received-call hunting. If a call is received for line 1 and line 1 is currently in progress on another call, the incoming call can be automatically routed to another line. Thus, the control processor 20 can "hunt" for a vacant line among all of the lines provisioned and terminate the call (ring) on a vacant one. Intelligent control and dynamic time slot assignment contained within the cable phone enables this type of operation.

Other features include an intercom and conferencing. With the intercom feature, users can signal from one adapter module to another without consuming network resources. In conferencing, an adapter module takse on the characteristics of an "extension" phone by simple time slot assignments. Thus, in a building where multiple extensions of the same line are required, adaper modules are programmed to logically connect to the same line (or telephone number) eliminating the need for additional wiring.

What is claimed is:

1. A telephone system comprising:
    a broadband medium interface unit for coupling to a relatively broadband medium capable of conveying multiple telephone channels to the broadband medium access unit from a telephone network;
    a relatively narrowband telephone line within a customer premises coupling the broadband medium access unit to a plurality of telephone adapters, each having means for coupling a unique telephone thereto such that there is a one-to-one relationship between telephone adapters and unique telephones;
    wherein the broadband medium interface unit comprises:
        a digital signal processor for processing signals from the broadband medium and delivering them to the telephone line as digitized voice carried by super-audio time divided digital signals, and for processing super-audio time divided digital signals from the telephone line and delivering them to the broadband medium as broadband medium telephone signals;
        signaling circuitry for processing subscriber line signaling from the broadband medium and converting the subscriber line signaling to packetized signaling associated with the super-audio time divided digital signals on the relatively narrowband telephone line; and
    wherein each telephone adapter comprises:
        a subscriber line interface circuit (SLIC) connectable to the unique telephone;
        a line interface coupled to the telephone line, said packetized signaling including information to direct the signaling to a predetermined telephone adapter;
        a codec coupled to the SLIC, performing a voice coding/decoding function; and
        a timing circuit for time multiplexing and demultiplexing of digitized voice signals between the SLIC and the line interface.

2. The system of claim 1 wherein each adapter comprises a power circuit coupled to the SLIC, the signaling circuit, the codec and the timing circuit for powering the SLIC, the signaling circuit, the codec and the timing circuit.

3. The system of claim 1, further comprising an analog telephone coupled to the SLIC, the signaling circuit, the codec and the timing circuit for powering the SLIC, the signaling circuit, the codec and the timing circuit.

4. The system of claim 3 wherein each adapter comprises an independent power source for supplying power to the SLIC, the signaling circuit and the codec of that adapter, independent of power from the telephone line.

5. The system of claim 4 wherein the independent power source is a mains power circuit for drawing power from a mains power supply.

6. The system of claim 1, wherein the super-audio time divided digital signals are conveyed between the broadband medium interface unit and the telephone adapters using a time division duplex protocol.

7. The system of claim 1, wherein digitized voice signals between the broadband medium interface unit and the telephone adapters are modulated and demodulated by the codec using Gaussian filtered non-return-to-zero modulation.

8. The system of claim 1, further comprising means at the signaling circuitry for bridging a logical communication channel to a first telephone line adapter with a logical communication channel to a second telephone line adapter to provide a time division multiplex connection between first and second telephones connected to the first and second telephone line adapters.

9. The system of claim 8, wherein each telephone adapter comprises means for receiving a dual tone multi-frequency signal from a telephone and converting the dual tone multi-frequency signal to a digital signal on the telephone line.

10. A first adapter for connecting a first unique telephone to a telephone wire within a customer premises, and a second adapter operationally equivalent to the first adapter for connecting a second unique telephone to the telephone wire within the customer premises, the first adapter operative to communicate over the telephone wire in combination with the second adapter, the first adapter comprising:

a subscriber line interface circuit (SLIC) with a connector for connecting the first unique telephone to the SLIC;

a line interface for coupling to a telephone line;

a signaling circuit coupled to the line interface for receiving and providing subscriber line signaling on the telephone line;

a codec coupled to the SLIC, performing a voice coding/decoding function wherein the voice coding/decoding function includes packetizing and adding a header to the packet of an encoding voice signal, the header including information for determining if the first unique telephone is intended to receive the voice signal; and a timing circuit for time multiplexing and demultiplexing of digitized voice signals between the SLIC and the line interface.

11. The first adapter of claim 1 further comprising a power circuit coupled to the line interface for drawing power from the telephone line and coupled to the SLIC, the signaling circuit, the codec and the timing circuit for powering the SLIC, the signaling circuit, the codec and the timing circuit.

12. The first adapter of claim 1 further comprising a mains power circuit for drawing power from a mains power supply and coupled to the SLIC, the signaling circuit, the codec and the timing circuit for powering the SLIC, the signaling circuit, the codec and the timing circuit.

13. The first adapter of claim 10, wherein the timing circuit time multiplexes and demultiplexes the digitized voice signals between the SLIC and the line interface using a time division duplex protocol.

14. The first adapter of claim 10, wherein the codec has a signaling slave circuit coupled thereto for performing the time multiplexing and demultiplexing.

15. The first adapter of claim 10, wherein digitized voice signals to and from the telephone line are modulated and demodulated using Gaussian filtered non-return-to-zero modulation.

16. The first adapter of claim 10, wherein digitized voice signals to and from the telephone line are modulated and demodulated using Gaussian minimum shift keying modulation.

17. The first adapter of claim 10, further comprising means for receiving a dual tone multi-frequency signal from a telephone and converting the dual tone multi-frequency signal to a digital signal on the telephone line.

\* \* \* \* \*